(12) United States Patent
Wu

(10) Patent No.: US 7,862,006 B2
(45) Date of Patent: Jan. 4, 2011

(54) AIR INTAKE VALVE APPARATUS FOR PNEUMATIC GUN

(75) Inventor: Chin-Wen Wu, Taipei County (TW)

(73) Assignee: Keymore International Co. Ltd., Taipei County (TW)

( * ) Notice: Subject to any disclaimer, the term of this patent is extended or adjusted under 35 U.S.C. 154(b) by 548 days.

(21) Appl. No.: 11/984,698

(22) Filed: Nov. 21, 2007

(65) Prior Publication Data

US 2009/0126809 A1  May 21, 2009

(51) Int. Cl.
*F16K 39/02* (2006.01)

(52) U.S. Cl. .................. 251/322; 251/324; 251/900

(58) Field of Classification Search .......... 251/322, 251/324, 900; 124/73, 74, 75
See application file for complete search history.

(56) References Cited

U.S. PATENT DOCUMENTS

| 2,485,504 | A | * | 10/1949 | Morgan | 251/324 |
| 2,621,885 | A | * | 12/1952 | Schmitt | 251/324 |
| 3,199,540 | A | * | 8/1965 | Forster | 251/324 |
| 4,304,258 | A | * | 12/1981 | Mitchell | 251/76 |
| 5,067,518 | A | * | 11/1991 | Kosmyna | 137/588 |
| 5,297,777 | A | * | 3/1994 | Yie | 251/324 |
| 5,538,042 | A | * | 7/1996 | Baland | 137/625.63 |
| 5,613,483 | A | * | 3/1997 | Lukas et al. | 124/73 |
| 5,769,066 | A | * | 6/1998 | Schneider | 124/75 |
| 5,791,328 | A | * | 8/1998 | Alexander | 124/76 |
| 6,409,150 | B2 | * | 6/2002 | Sullivan et al. | 124/73 |
| 6,546,950 | B1 | * | 4/2003 | Juan | 137/270 |
| 2005/0194558 | A1 | * | 9/2005 | Carnall et al. | 251/344 |

* cited by examiner

*Primary Examiner*—John Bastianelli
(74) *Attorney, Agent, or Firm*—Schmeiser, Olsen & Watts LLP

(57) ABSTRACT

An air intake valve apparatus for pneumatic tool, configured in an intake port of a pneumatic tool for controlling air circulations, mainly comprises a valve base configured in the intake port of the pneumatic tool, a stem configured through the valve base inside capable of shifting to a air-blocking position and a air-exhausting corresponding to the valve base and a flexible component propped the stem for keeping the stem on the air-blocking position regularly, wherein the stem has a first portion, a second portion and a mid-reducing portion, the mid-reducing portion is coupled to the first portion and the second portion respectively with different transiting surfaces so as to maintain the force driving the stem in constant no matter the air pressure entering the valve base is lower or higher.

10 Claims, 7 Drawing Sheets

AIR INTAKE VALVE APPARATUS FOR PNEUMATIC GUN

The present invention relates to an air intake valve apparatus, and more particularly to a pneumatic tool driven by air pressure.

BACKGROUND ART

Referring to FIG. 1, a conventional air intake valve apparatus applying for pneumatic gun is illustrated, the air intake valve assembled within a magazine, comprises a valve base 30, a stem 32 configured through the valve base 30 inside for being driving and a spring 34 used to bias the stem 32. Please also referring to FIG. 2, an air-introducing eyelet 302 and an air-exhausting eyelet 304 are configured on the valve base 30. Regularly, since the stem 32 is biased by the spring so as to be maintained on a position which blocking the air-introducing eyelet 302, when the stem 32 hit by a force forwarding the arrow direction, the stem 32 would be shifted forward to the direction forcing the spring then pushed back to the original position by the spring. At the same time the stem is pushed by the force, air could flow into the valve base 30 through the air-introducing eyelet 302 and be released from the valve base 30 through the air-exhausting eyelet 304.

The stem 32 further has a first portion 322 correspondingly contacting with the spring, a second portion 324 extending to the external side of the valve base 30 partly and a cylinder stick 326 mounted between the first portion 322 and the second portion 324. In this embodiment, the first portion 322 is formed in a trump shape and its external side surface is a flat surface to be biased by the spring and maintain the air-introducing eyelet 302 on a blocking position. Excepting to the biasing force generated by the spring, the stem 32 itself also takes the force made by air on the outside of the first portion 322. When the pressure is higher, the force made by air on the outside of the first portion 322 is correspondingly raising. In other word, along with different air pressures forced on the stem 32, the force hit the stem 32 is correspondingly changed.

Thereby, when the pneumatic gun uses different air pressure for conducting, the force applying on the stem of the air intake valve is also different. Therefore, the air intake valve must be adapted or replaced proper items before executing normal functions.

SUMMARY OF THE INVENTION

The present invention mainly provides an air intake valve apparatus for a pneumatic tool, wherein the hit force driving the stem is in constant whether the air classes or the air pressure used by the pneumatic tool is different.

To implement above functions, the present invention provides an air intake valve apparatus containing:

a valve base, with a chamber, an air-introducing eyelet and an air-exhausting eyelet connecting with the chamber;

a stem, configured through the chamber and capable of shifting to an air-blocking position for blocking the air-exhausting eyelet corresponding to the valve base.

a flexible component, configured on the outside of the stem to bias the stem into a closed position where air is not exhausted; wherein the chamber has a first airtight ring and a second airtight ring, and the stem further includes a first portion casing through the first airtight ring inside, a second portion casing through the second airtight ring and a nick-reducing portion coupled between the first portion and the second portion with different transiting surfaces.

Moreover, the chamber further comprises a positioning spring, which is configured between the first airtight ring and the second airtight ring to bias the first airtight ring and the second airtight ring positioning in the valve base.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

DESCRIPTION OF THE EMBODIMENT

Reference will now be made in detail to the embodiments of the present invention, an air intake valve apparatus for pneumatic gun. While the invention will be described in conjunction with the embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Figure 1:
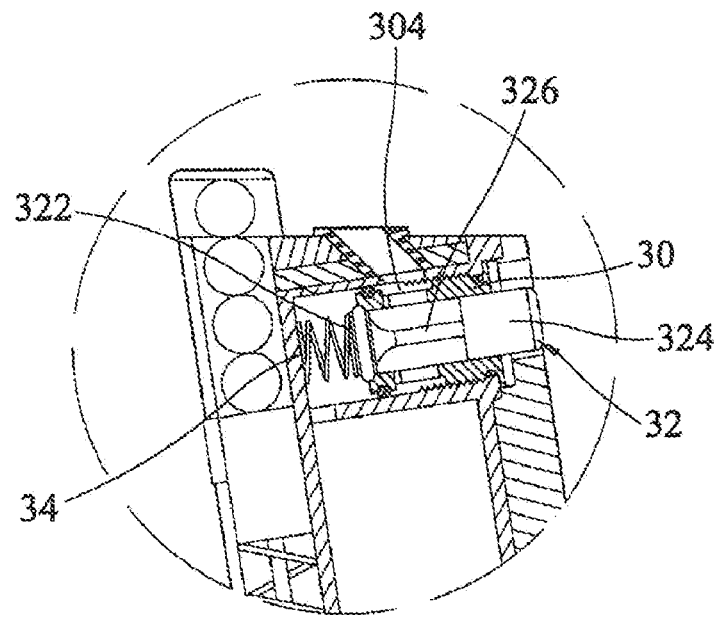
FIG. 1 illustrates a cross-section view of a conventional air intake valve apparatus for a pneumatic gun.
Figure 2:
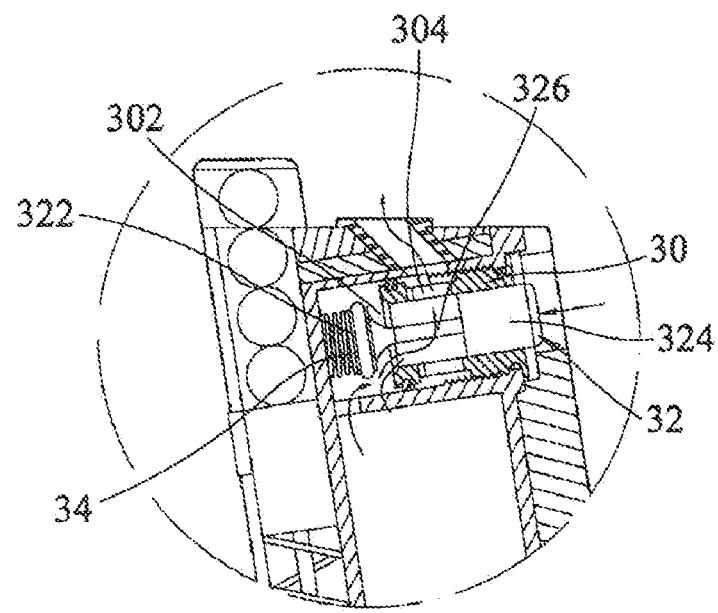
FIG. 2 illustrates an operation diagram of the conventional air intake valve apparatus for a pneumatic gun disclosed in FIG. 1.
Figure 3:
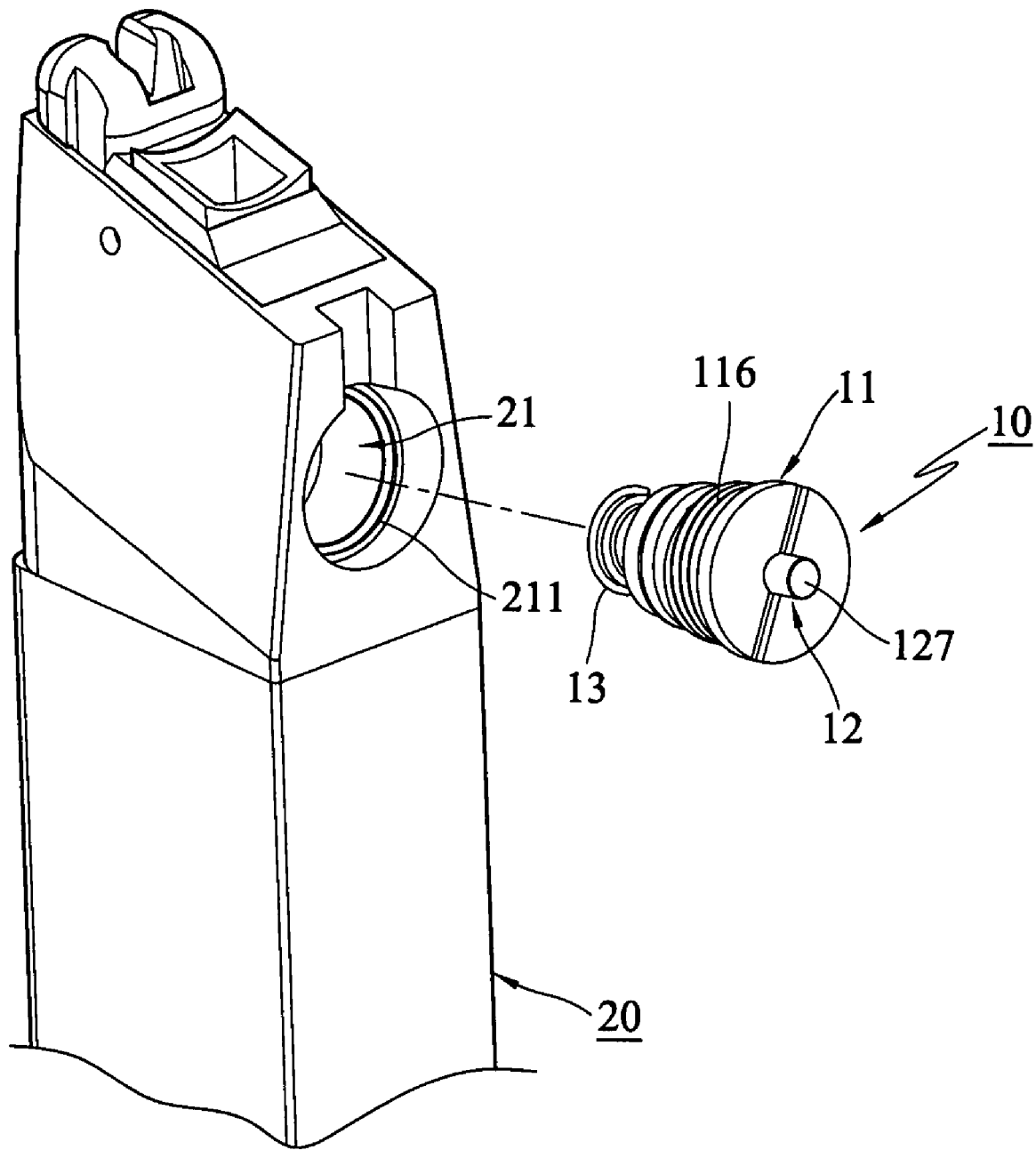
FIG. 3 illustrates an isometric view of the air intake apparatus and matching a magazine of the pneumatic gun thereof according to one embodiment of the present invention.

Please referring to FIG. 3, an air intake valve 10 and a magazine 20 of a pneumatic gun according to a preferred embodiment of the present invention are illustrated. The magazine 20 has an intake port for passing through the air to push a bullet. In addition, on one side of the magazine 20 is formed a storage hole 21 expending inside and coupled to the intake port. Furthermore, the storage hole 21 is capable of assembling with the air intake valve 10 so as to make the intake port capable of controlling air-passing timing and quantities of air-flowing.

Figure 4:
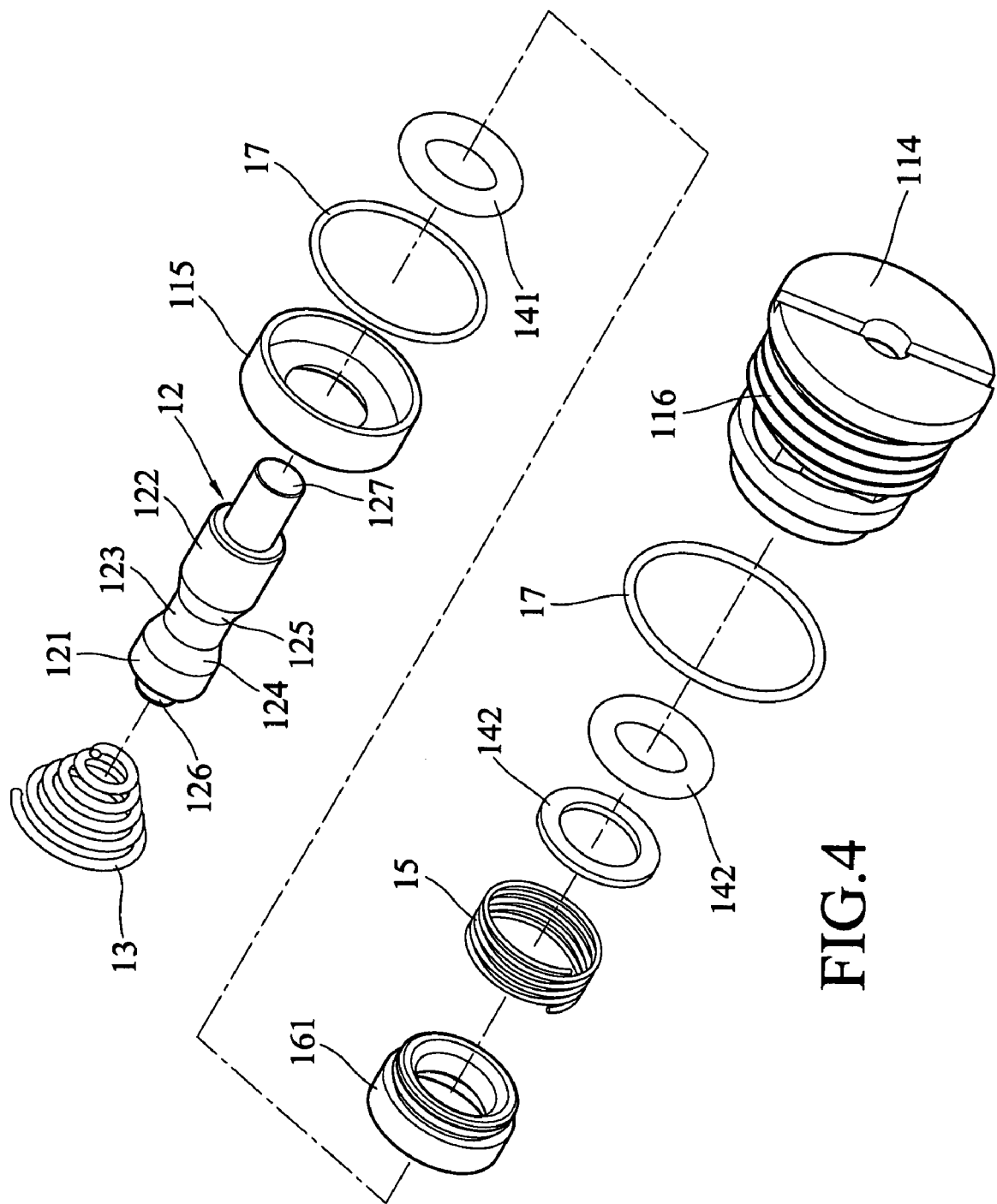
FIG. 4 illustrates an isometric exploded view of the air intake apparatus according to one embodiment of the present invention.

FIG. 4 is an exploded view of the air intake valve according to a preferred embodiment of the present invention.

Figure 5:
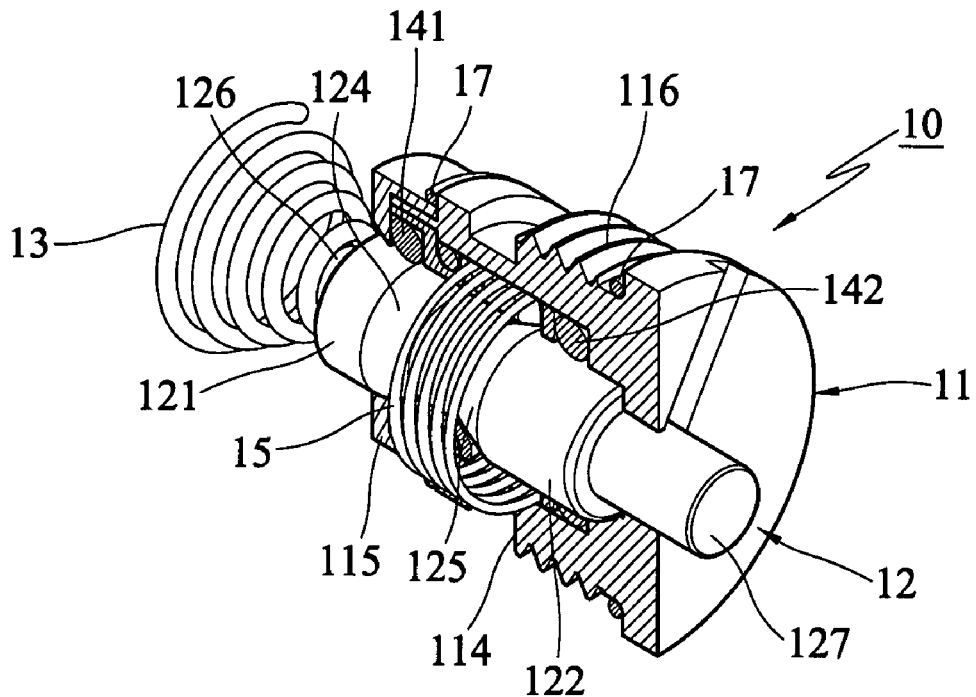
FIG. 5 illustrates an isometric view of the air intake apparatus according to one embodiment of the present invention.
Figure 6:
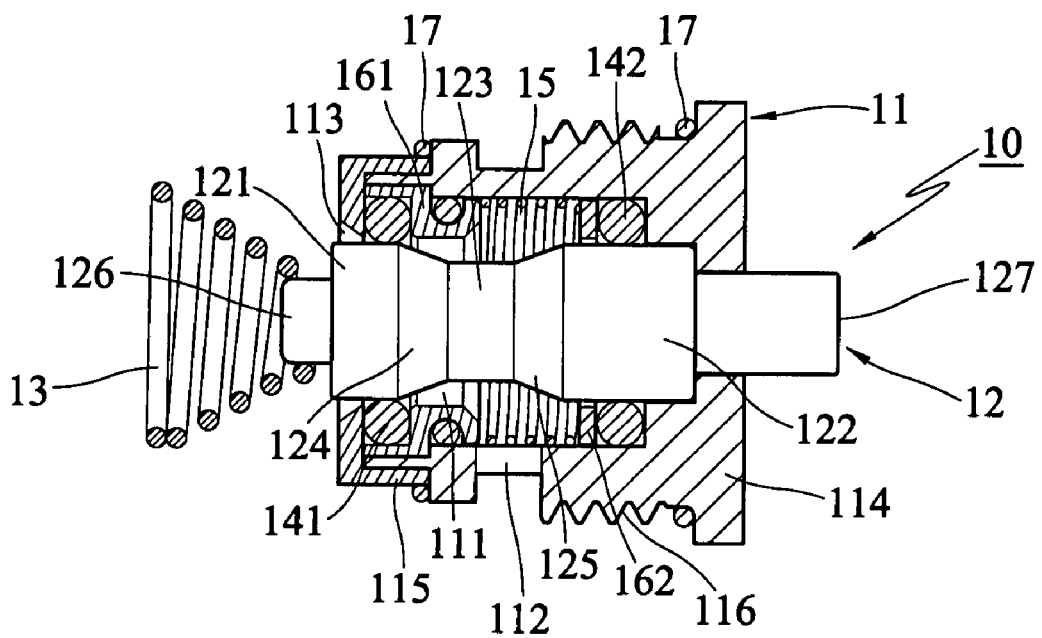
FIG. 6 illustrates a cross section view of the air intake apparatus according to one embodiment of the present invention.

FIG. 5 is an isometric view of the assembled air intake valve 10 according to a preferred embodiment of the present invention. FIG. 6 is a cross-section view of the assembled air intake valve 10 according to a preferred embodiment of the present invention. The air intake valve 10 comprises a valve base 11 assembled in the intake port of the magazine 20, a stem, configured in the valve base 11 and capable of being shifted to an air-blocking position and an air-exhausting position corresponding to the valve base 11, and a flexible component 13 configured on the outside of stem 12 to bias the stem into a closed position where air is not exhausted. Wherein the valve base 11 has a chamber 111 having an air-introducing eyelet 112 and an air-exhausting eyelet 113 connecting with the chamber 111 so that air could be exhausted from the chamber 111 through the air-exhausting eyelet 113 after air is leaded into the chamber 111 through the air-introducing eyelet 112.

In this embodiment, the valve base further comprises a cannular cylinder 114 and a cover 115 with an air-exhausting eyelet 113.

The chamber 111 has a first airtight ring 141 and a second airtight ring 142 disposed therein, in this embodiment, the first airtight ring 141 and a second airtight ring 142 are fixed in the chamber 111 by tabling. Alternatively, it is implemented by configuring a spring between the first airtight ring 141 and the second airtight ring 142 so as to bias the first airtight ring 141 and the second airtight ring 142 on two predefined positions of the two ends of the chamber 111. Moreover, a first spacer 161 and a second spacer 162 are further configured respectively between the first airtight ring 141 and the second airtight ring 142.

The stem 12, is a cylinder stick with varying circumferences. The stem 12 further comprises a first portion 121, a second portion 122 and a nick-reducing portion, with narrow circumferences complying with the first portion 121 and the second portion 122, coupled between the first portion and the second portion with different transiting surfaces 124, 125. Wherein the first portion cases through the first airtight ring inside so as to maintain airtight state in the chamber, the second portion also cases through the second airtight ring so as to make sure air being induced into the chamber 111 through the air-introducing eyelet 112 withput leaking from chinks of the contact surfaces.

As illustrated, the stem 12 further comprises a bump 126 extending axially from the first portion 121 for abutting against the flexible component 13. In addition, the stem 12 further comprises a hit portion 127 extending axially from the second portion 122 for taking external force and shifting correspondingly.

The flexible component 13 is a snail-shape spring in this embodiment, the flexible component 13 could be replaced by sorts of other spring types or other element with the same functions as above spring.

Furthermore, the flexible component 13 is configured on the outside of the stem 12 to bias the stem into a closed position where air is not exhausted so as to keep air flowing into the chamber 111 without leaking out the valve base 11 from the air-exhausting eyelet 113.

Figure 7:
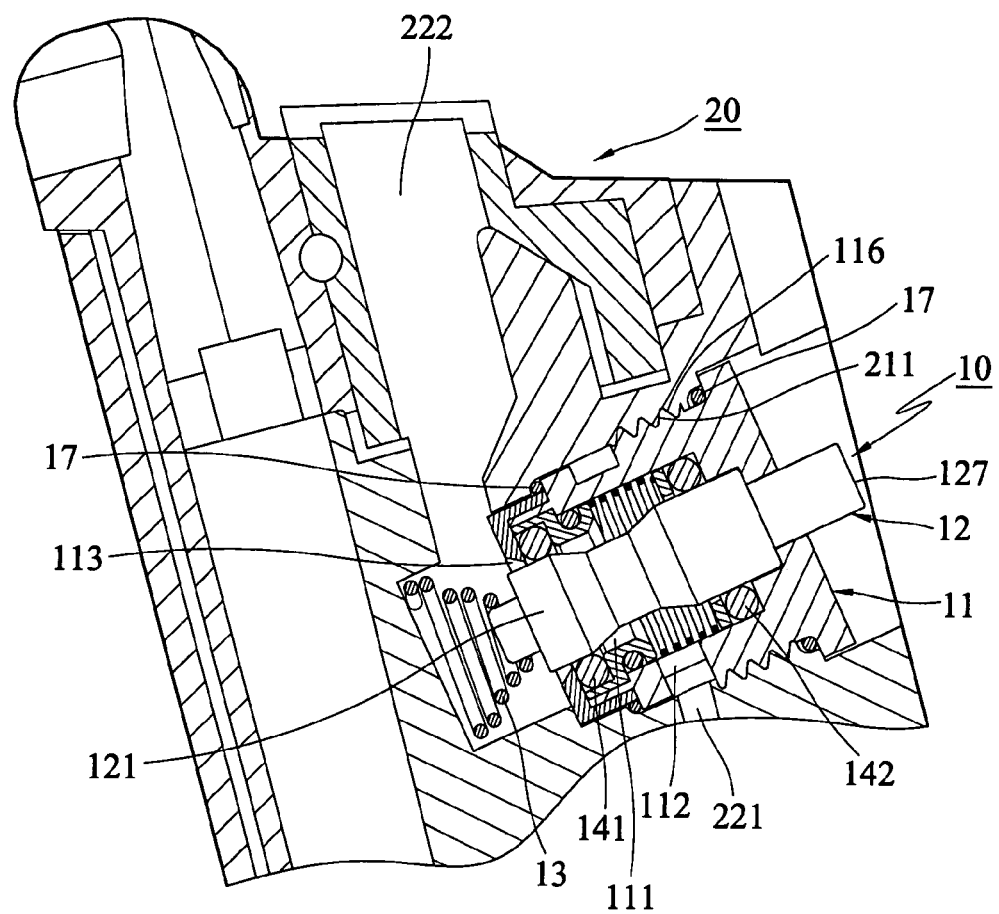
FIG. 7 illustrates a blocking state that shows the stem is biased by the flexible component so as to maintain on the air-blocking position which blocking the air-exhausting eyelet.
Figure 8:
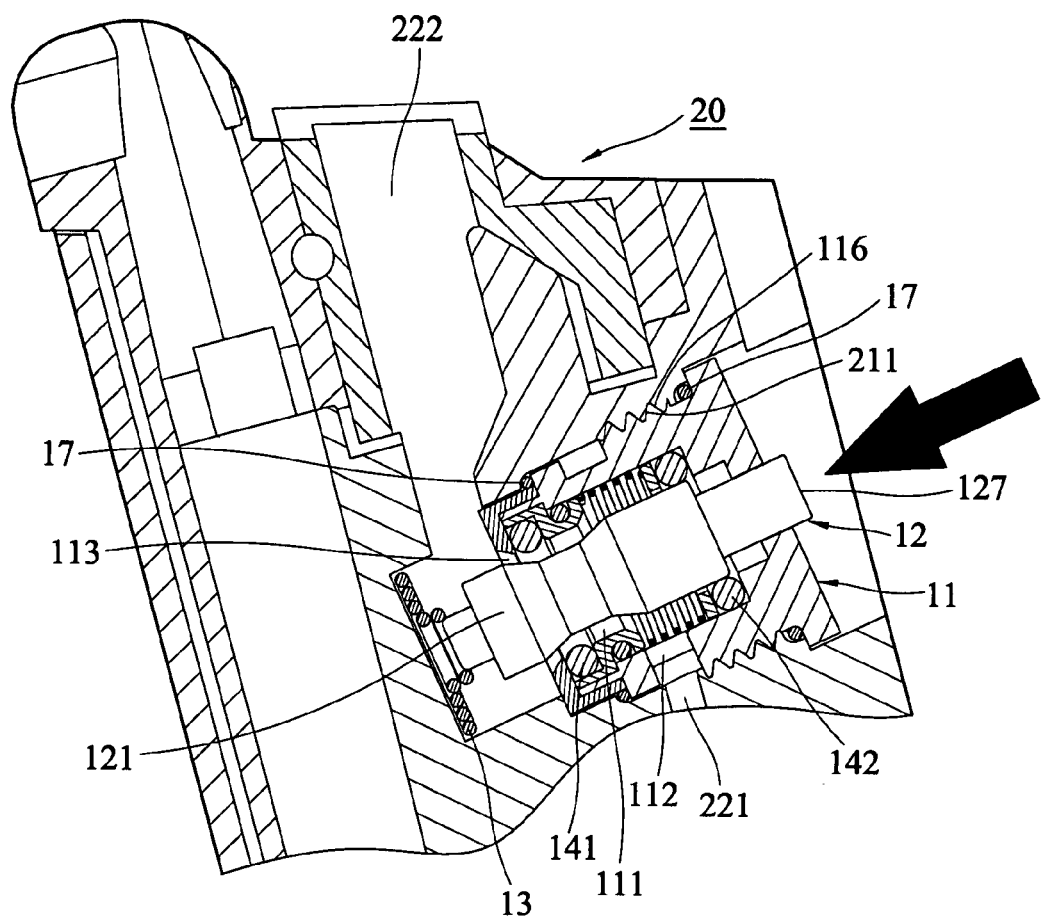
FIG. 8 illustrates an air-exhausting state that shows the stem is biased by external force for shifting to the air-exhausting position correspondingly to the valve base so as to allow air exhausted through the air-exhausting eyelet.

Please referring to block diagrams of the combination with the intake valve 10 and the magazine 20 illustrated in FIG. 7 and FIG. 8 according to a preferred embodiment of the present invention. FIG. 7 illustrates a blocking state that shows the stem 12 is biased by the flexible component 13 so as to be maintained on the air-blocking position which blocking the air-exhausting eyelet 113. FIG. 8 illustrates an air-exhausting state that shows the stem 12 is biased by an external force for being shifted to the air-exhausting position correspondingly to the valve base 11 so as to allow air being exhausted through the air-exhausting eyelet 113.

Please referring to FIG. 3, the storage hole 21 of the magazine 20 further has an internal thread 211 and the outer surface of the valve base 11 has an external thread 116 for matching the internal thread 211. For avoiding air to leaks from seams of connecting surfaces, at least one third airtight ring 17 could be further covered on the outer surface of the valve base 11 to prevent air from leaking from the seams.

When the stem 12 hit by a force forwarding the arrow direction, since the first portion 121 and the first airtight ring 141 are not airtight, air introduced into the chamber 111 through a lower air-intake port 221 could flow out of the chamber through the air-exhausting eyelet 113 and is introduced into a upper air-intake port 221 at this instant time. After that, the stem 12 is reconfigured on the air-blocking position and stops operation.

According to above descriptions, the stem 12 will not gather air-pressure at any specific part of the stem 12. Therefore, whether air pressure introduced into the valve base 11 is lower or higher, the hit force to drive the stem 12 is in constant without influencing air pressure.

In other word, it maintains the force to drive the stem in constant no matter the air pressure entering the valve base is lower or higher.

Figure 9:
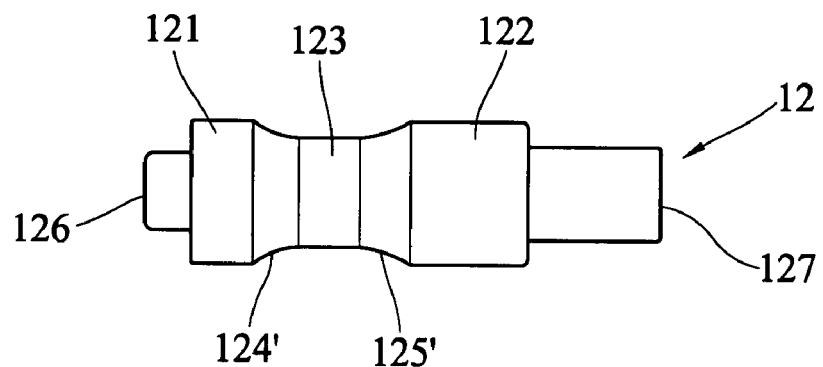
FIG. 9 illustrates an isometric view of the stem of the air intake apparatus according to another embodiment of the present invention.
Figure 10:
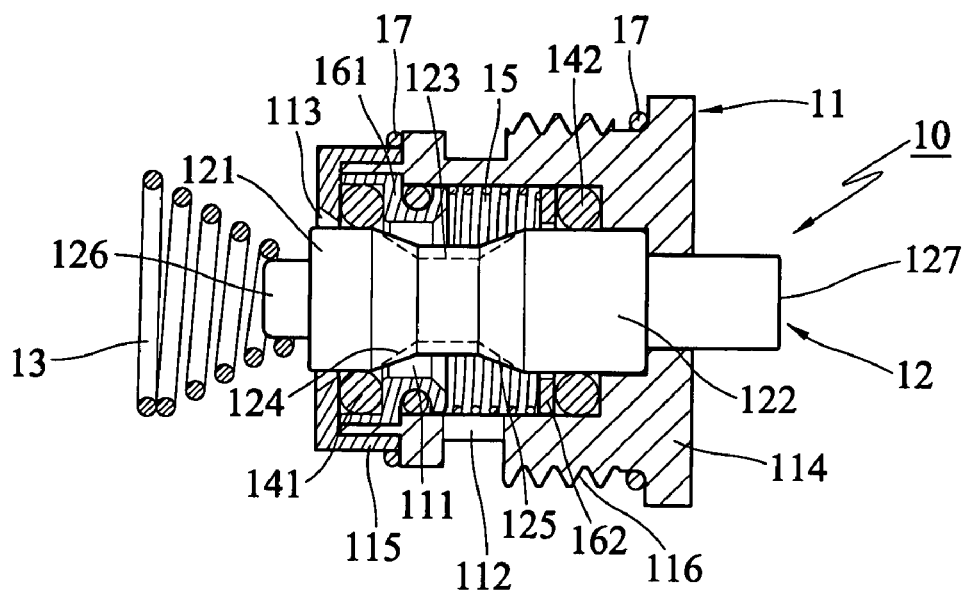
FIG. 10 illustrates an isometric view of the stem of the air intake apparatus according to another embodiment of the present invention.

In design, the transiting surfaces 124, 125 could be formed in an oblique shape disclosed in above FIGs or with a curve design as disclosed in FIG. 9. Please referring to FIG. 10, the exhausting air quantities would increases because the flowing space is endangered when the external circumference of a nick-reducing portion 123 of the stem 12 is reducing and the stem 12 is shifted to the air-exhausting position by the external force. In the contrary, the exhausting air quantities would reduces because the flowing space is reduced when the external circumference of a nick-reducing portion 123 of the stem 12 is increasing.

According to above descriptions, in conclusion, the air intake valve 10 is capable of maintaining the force to drive the stem in constant no matter the air pressure entering the valve base is lower or higher.

Foregoing descriptions and drawings represent the preferred embodiments of the present invention, it will be understood that various additions, modifications and substitutions may be made therein without departing from the spirit and scope of the principles of the present invention as defined in the accompanying claims. One skilled in the art will appreciate that the invention may be used with many modifications of form, structure, arrangement, proportions, materials, elements, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being indicated by the appended claims and their legal equivalents, and not limited to the foregoing description.

What is claimed is:

1. An air intake valve apparatus for a pneumatic gun, configured in an air-intake port of the pneumatic gun, for controlling air-flowing, comprising:

a valve base, configured in the air-intake port of the pneumatic gun, having a chamber, an air-introducing eyelet and an air-exhausting eyelet connecting with the chamber;

a stem, configured through the chamber and capable of shifting to an air-blocking position for blocking the air-exhausting eyelet corresponding to the valve base; and a flexible component, configured on the outside of the stem to bias the stem into a closed position where air is not exhausted, wherein the chamber has a first airtight ring and a second airtight ring and the stem further comprises:

a first portion casing through the first airtight ring inside;

a second portion casing through the second airtight ring;

a nick-reducing portion coupled between the first portion and the second portion with different transiting surfaces; and a positioning spring is configured between the first airtight ring and the second airtight ring to bias the first airtight ring and the second airtight ring positioning in the valve base.

2. The air intake valve apparatus of claim 1, wherein the flexible component is configured at the outside of the air-exhausting eyelet for abutting against the edge of the first portion of the stem.

3. The air intake valve apparatus of claim 1, wherein the flexible component is a spring.

4. The air intake valve apparatus of claim 3, wherein the stem further comprises a bump extending axially from the first portion for abutting against the flexible component.

5. The air intake valve apparatus of claim 3, wherein the stem further comprises a hit portion extending axially from the second portion for taking external force and shifting correspondingly.

6. The air intake valve apparatus of claim 1, wherein the valve base further comprises a cannular cylinder and a back cover.

7. The air intake valve apparatus of claim 6, wherein the air-introducing eyelet is arranged at the cannular cylinder and the air-exhausting eyelet is arranged at the back cover.

8. The air intake valve apparatus of claim 1, wherein shapes of the transiting surfaces are selected from an oblique shape or a curve shape.

9. The air intake valve apparatus of claim 1, wherein the outside surface of the valve base has an external thread.

10. The air intake valve apparatus of claim 1, wherein at least one third airtight ring is arranged at the outside surface of the valve base.

* * * * *